(12) United States Patent
Knittel

(10) Patent No.: US 8,036,094 B2
(45) Date of Patent: Oct. 11, 2011

(54) OBJECTIVE LENS AND OPTICAL DATA STORAGE APPARATUS COMPRISING THE OBJECTIVE LENS

(75) Inventor: Joachim Knittel, Tuttlingen (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 12/806,783

(22) Filed: Aug. 20, 2010

(65) Prior Publication Data
US 2011/0044153 A1    Feb. 24, 2011

(30) Foreign Application Priority Data
Aug. 21, 2009 (EP) .................................... 09305774

(51) Int. Cl.
*G11B 7/00* (2006.01)
(52) U.S. Cl. ............. 369/112.23; 369/112.02; 369/13.33
(58) Field of Classification Search ................. 369/13.33
See application file for complete search history.

(56) References Cited

U.S. PATENT DOCUMENTS

| | | | |
|---|---|---|---|
| 4,904,063 A * | 2/1990 | Okada et al. ................... | 359/742 |
| 5,416,757 A * | 5/1995 | Luecke et al. ................ | 369/44.23 |
| 6,567,365 B1 * | 5/2003 | Hendriks et al. .......... | 369/112.02 |
| 2006/0143636 A1 | 6/2006 | Shin | |

FOREIGN PATENT DOCUMENTS

| | | |
|---|---|---|
| EP | 1400963 | 3/2004 |
| EP | 1785991 | 5/2007 |
| JP | 2000163792 | 6/2000 |
| JP | 2001184691 | 7/2001 |

OTHER PUBLICATIONS

International Search report dated Dec. 15, 2009.

* cited by examiner

*Primary Examiner* — Jorge Ortiz Criado
(74) *Attorney, Agent, or Firm* — Robert D. Shedd; Harvey D. Fried; Richard LaPeruta

(57) ABSTRACT

An objective lens is described, which is switchable between a far-field mode and a near-field mode. The objective lens comprises a lens, an optical element having a variable refractive index and a solid immersion lens, which are disposed on a common optical axis, wherein the optical element is arranged at a convex side of the solid immersion lens and has a top and a bottom surface arranged adjacent to each other in a direction of the optical axis, the bottom surface having a concave shape that is adapted to the shape of the convex side of the solid immersion lens and the top surface having a curvature that is lower than a curvature of the convex side of the solid immersion lens, and wherein a difference between a refractive index of the optical element and the solid immersion lens is small in the far-field mode so that the solid immersion lens and the optical element act substantially as a single optical element in the far-field mode, whereas the difference is large in the near-field mode so that the optical effect of the solid immersion lens is significant in the near-field mode.

15 Claims, 3 Drawing Sheets

OBJECTIVE LENS AND OPTICAL DATA STORAGE APPARATUS COMPRISING THE OBJECTIVE LENS

This application claims the benefit, under 35 U.S.C. §119 of European Patent Application 09305774.3, filed Aug. 21, 2009.

FIELD OF THE INVENTION

The present invention relates to an objective lens, which is switchable between a far-field mode and a near-field mode, and further to an apparatus for reading from and/or writing to optical recording media comprising an optical head with the aforementioned objective lens.

BACKGROUND OF THE INVENTION

Nowadays information technology is confronted with an increasing amount of data, due to more complex or multimedia applications. Accordingly, removable data storage devices with a high storage capacity are needed, e.g. for high resolution movies or video games. Well at the beginning of information technology, magnetic storage devices were favored, while nowadays, optical storage media such as CD (Compact Disk), DVD (Digital Versatile Disk) or BD (Blu-Ray Disk) are dominating the market for removable data storage media.

Optical data storage is generally limited by the optical resolution of the read/write-system. Straightforward methods of increasing the optical resolution involve widening of the focused beam and opening angle, i.e. the numerical aperture NA, at the costs of lens complexity. Further approaches are narrowing the allowable tilt margins for the optical recording media or reducing the wavelength of the scanning laser into the blue or near-UV range. A different approach for reducing the focus spot size in an optical data storage system is using near-field optics with a high numerical aperture. This high numerical aperture is generally achieved by help of a solid immersion lens (SIL). While conventional systems like CD, DVD or BD operate in the optical far-field regime, which is described by classical optics, the aforementioned new systems work in the optical near-field regime, which is described by near-field optics. For conventional systems the working distance, i.e. the air gap between the surface of the optical storage medium and the first optical surface of the read/write-head, is in the scale of 100 μm. In contrast, systems making use of near-field optics need a very small working distance or air gap, which is in the scale of 50 nm. An optical storage system for recording and/or reading making use of near-field optics is disclosed in WO 2005/104109 A1.

To provide compatibility between different storage media, so called compatible drives are needed. These drives are capable of reading from and/or writing to storage media belonging to different media generations, e.g. Blu-Ray disks as well as near-field optical storage media. Consequently, the optical head of such a compatible drive needs to be able to work in the far-field regime as well as in the near-field regime. A known approach is to include two objective lenses in the optical head of the respective data storage apparatus. The first objective lens is used in the far-field regime, whereas the second objective lens is used in the near-field regime. Each objective lens is designed for its specific purpose. However, such optical heads are usually fragile and expensive.

An alternative solution is disclosed in JP 2000-163792. An optical head includes an objective lens that is composed of a lens and an optical unit. The optical unit has a correction board and a solid immersion lens. For near-field operation the lens and the optical unit are arranged in the beam path. For far-field operation the optical unit is moved out of the beam path.

SUMMARY OF THE INVENTION

It is thus an object of the present invention to provide an objective lens for a compatible drive, which is applicable both in the near-field optical regime and in the far-field optical regime.

It is a further object of the present invention to propose an apparatus for reading from and/or writing to optical recording media making use of such an objective lens.

The above objects are achieved by the subject matter of the independent claims. Advantageous embodiments of the invention are subject matter of the dependent claims.

With this object in view, an objective lens is provided that is switchable between a far-field mode and a near-field mode. The objective lens comprises a lens, an optical element having a variable refractive index and a solid immersion lens. The aforementioned elements are disposed on a common optical axis. The optical element having a variable refractive index is arranged at a convex side of the solid immersion lens and has a top and a bottom surface arranged adjacent to each other in the direction of the optical axis. The bottom surface of said optical element has a concave shape that is adapted to the shape of the convex side of the solid immersion lens. The curvature of the top surface of said optical element is lower than the curvature of the convex side of the solid immersion lens. The refractive index of said optical element is varies in such way that a difference between the refractive index of said optical element and the solid immersion lens is small in the far-field mode so that the solid immersion lens and the optical element act substantially as a single optical element in the far-field mode, whereas said difference is large in the near-field mode so that the optical effect of the solid immersion lens is significant in the near-field mode.

The concept of the aforementioned invention is based on the following considerations:

Typically, a solid immersion lens is a plano-convex optical structure. Its optical effect is due to a very small working distance, which allows evanescent waves to propagate into the solid immersion lens, in combination with a high curvature of its convex side. Consequently, by arranging a further optical element with a variable refractive index at the convex side of the solid immersion lens, the refraction of said solid immersion lens may be varied. Preferably, said further optical element has a concave surface that is adapted to the convex shape of the solid immersion lens and further an opposite surface that is lower in curvature than the convex side of the solid immersion lens. In order to make this optical element switchable, it is made out of a material with a switchable refractive index.

The main idea for switching the objective lens between a far-field mode and a near-field mode is the variable difference between the refractive indices of said optical element and the solid immersion lens. In case the difference between the refractive indices is high, the optical effect of the solid immersion lens is significant, as it is known from the use of solid immersion lenses in air. In case the difference of the optical indices is small, the optical effect of the solid immersion lens is significantly lower, because the solid immersion lens plus the optical element act more or less as a single optical element. Since the surface of the optical element disposed opposite the solid immersion lens has a lower curvature than the convex side of the solid immersion lens, the overall optical effect is significantly lower than the one of the solid immersion lens. The objective lens is applicable in the optical far-field regime as well as in the optical near-field regime. A further advantage is that the optical system is realized without any moving parts. Consequently, a simple and reliable objective lens is provided. This feature makes it a perfect choice for a compatible drive for an optical data storage apparatus.

Advantageously, the refractive index of the optical element and the refractive index of the solid immersion lens are essentially identical when the objective lens is in the far-field mode. As mentioned before, the optical effect of the solid immersion lens significantly depends on the difference of the refraction indices between the solid immersion lens and said optical element. Consequently, if this difference nearly vanishes no refraction takes place at the bottom surface of said optical element. The solid immersion lens is made nearly invisible by the aforementioned measure.

Advantageously, the optical element is a liquid having a variable refractive index, which is confined in a cavity that is limited by a top and a bottom part in the direction of the optical axis. The top and bottom surfaces of the optical element are formed by a surface of the top and bottom part facing said cavity, respectively. Preferably, the top and bottom part each comprise an electrode, said electrodes being designed for generating an electric field inside the cavity for switching the refractive index of said liquid. Favorably a liquid crystal is used as said liquid. Accordingly, the refractive index of the optical element may be varied in a simple way. By applying an electric field to the liquid crystal material, the refractive index of said optical element is changed quickly and reliable.

As an alternative to the liquid crystal, a liquid having two immiscible phases with different refraction indices is used for the optical element. One of the two phases preferably is a dielectric fluid. The electrodes are segmented, a pair of first electrode segments being located in the central part and a pair of second electrode segments being located in a peripheral part of the optical element. A central part of the optical element here designates a region around or near to the optical axis, while a peripheral part of the optical element, preferably surrounding said central part, designates a part arranged at a distance to the optical axis.

By generating an electric field in the central part of the cavity, the dielectric phase of the aforementioned two phase liquid is pulled into said central part of the optical element. Preferably, the electrodes are coated by an insulating layer to prevent the liquid from electrochemical reactions. The peripheral part is preferably located outside the optical path. The refractive index of the optical element is switched simply by moving the dielectric phase into the optical path or by pushing it outside.

The electrodes in question are preferably located in a plane perpendicular to the optical axis. It is further advantageous to use a light-transmissive material, preferably indium tin oxide as a material for said electrodes. As indium tin oxide is conductive and optically transparent, it is the perfect choice for the electrodes. Further, it is a common material, known from a variety of thin film applications. Accordingly it is technically easy to handle, e.g. by sputter deposition.

Advantageously, the curvature of the top surface of the optical element is at least approximately zero. Further preferably, the top part has the form of a parallel plate extending in a plane perpendicular to the optical axis. The technical effect of the optical element having a variable refractive index is to compensate the optical power of the solid immersion lens. The easiest way to neutralize the solid immersion lens is to give the geometric sum of the solid immersion lens and the optical element the shape of a cuboid.

However, a cuboid causes significant spherical aberrations. In order to compensate these spherical aberrations, the top part advantageously has a shape of a spherical aberration correction lens, wherein the difference of the refractive indices between the top part and the liquid is higher in the far-field mode than in the near-field mode. Preferably, this spherical aberration correction lens has a plane surface and a curved surface, wherein the curved surface is facing the cavity. While working in the far-field mode, the difference of the refractive indices between the liquid and the spherical aberration correction lens is high. Accordingly, significant refraction takes place at the interface between the liquid and said aberration correction lens. In case the objective lens is switched to the near-field mode, the liquid significantly changes its refractive index. Accordingly, the aforementioned interface between the liquid and the spherical aberration correction lens causes only little refraction of light passing said interface. As a consequence, the spherical aberration correction lens is active only in case the objective lens is operated in far-field mode, while in the near-field mode the spherical aberration correction lens is nearly invisible. A spherical aberration correction lens is advantageous when working in far-field mode, while it perturbs the optics in the near-field mode.

Preferably, the spherical aberration correction lens is a Schmidt-plate. Schmidt-plates are known from so called Schmidt-telescopes. While in these telescopes Schmidt-plates are used to compensate for the spherical aberration effect of a mirror, in the present case only the principle of the Schmidt-plate is adapted to the objective lens in question.

Preferably, the refractive index of the optical element in the far-field mode as well as the refractive index of the solid immersion lens is approximately n=3. A refractive index of n=3 is a typical value known for material used for solid immersion lenses. Accordingly, it is advantageous if the optical element is capable of reaching this value. It is further advantageous if the refractive index of the optical element is approximately n=1 in case the objective lens is working in the near-field mode. A refractive index of n=1 provides nearly the same situation as in air. Consequently, the solid immersion lens shows its best efficiency.

According to a further aspect of the invention, an apparatus for reading from and/or writing to optical recording media includes an optical head for operating in a near-field mode and in a far-field mode, which includes an objective lens according to the invention.

The same or similar advantages as mentioned for the objective lens likewise apply to an apparatus for reading from and/or writing to optical recording media, which includes an objective lens according to the invention.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
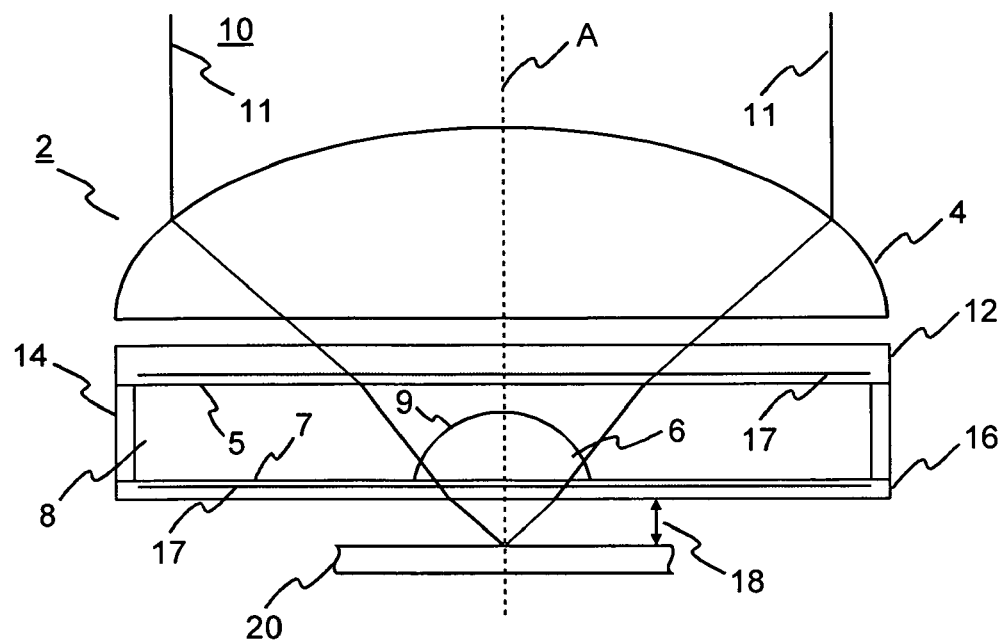
FIG. 1 shows an objective lens according to a first embodiment in a far-field mode.
Figure 2:
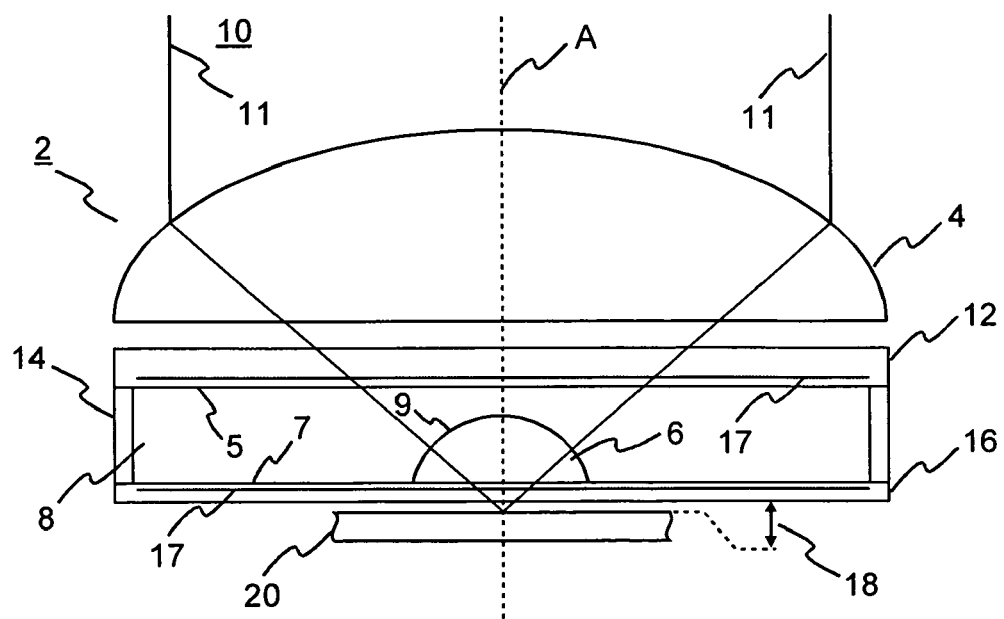
FIG. 2 depicts the objective lens of FIG. 1 in a near-field mode.

A first embodiment of an objective lens 2 according to the invention is shown in FIGS. 1 and 2, wherein FIG. 1 depicts the objective lens 2 in a far-field mode, whereas FIG. 2 depicts the objective lens 2 in a near-field mode. The objective lens 2 comprises a lens 4, a solid immersion lens 6 and an optical element 8 having a variable refractive index. The aforementioned units, i.e. the optical element 8, the lens 4 and the solid immersion lens 6 are disposed on a common optical axis A, drawn as a dashed line. According to the embodiment shown in FIGS. 1 and 2, the optical element 8 is a liquid crystal confined in a cavity that is limited by a top part 12 and a bottom part 16 spaced apart by an annular ring 14 in a direction of the optical axis A. The shape of the optical element 8 is determinate by a shape of a surface facing the cavity of the top and bottom part 12, 16, respectively. These interfaces between the liquid confined by the cavity and said inner surfaces determine a top and bottom surface 5, 7 of the optical element 8. Since this optical element 8 is a liquid, its shape is not only perfectly adapted to the shape of said inner surfaces of the top and bottom part 12, 16, respectively, but its shape is also perfectly adapted to a shape of a convex side 9 of the solid immersion lens 6. The refractive index of the optical element 8 is varied by applying an electric field to the liquid crystal. Electrodes 17 are arranged in or on the top and bottom part 12, 16, respectively. By help of the aforementioned electrodes 17 an electric field may be applied to the liquid crystal in order to change its refractive index. Preferably, the electrodes 17 extend in a plane that is aligned perpendicular to the optical axis A. The electrodes 17 are made from a light transmissive material, preferable indium-tin-oxide.

A light beam 10, limited by two exemplary rays 11, travels through the lens 4 and enters the optical element 8 from its top side. The light beam 10 passes the top part 12, which is preferably made from a material having a refractive index of about n=1. Subsequently, the light beam 10 enters the optical element 8, i.e. the cavity filled with the liquid crystal material. Since the refractive index of said liquid crystal material is switched to value n>1, diffraction of the light beam 10 takes place at the interface between the top part 12 and the liquid crystal comprised by the cavity.

Since the refractive index of the liquid crystal is switched to a value that is preferably very near to the value of the refractive index of the solid immersion lens 6, the light beam 10 passes the interface between the liquid crystal and the solid immersion lens 6 without diffraction. Preferably, the refractive index of the solid immersion lens 6 as well as the refractive index of the liquid crystal is in the range of n=3.

The bottom part 16 of the optical element 8 is made from a material having a refractive index similar to the refractive index of the solid immersion lens 6. Preferably, the bottom part 16 is made from the same material as the solid immersion lens 6. Accordingly, at the interface between the solid immersion lens 6 and the bottom part 16 no diffraction takes place. When leaving the bottom part 16, diffraction of the light beam 10 takes place, since the surrounding air typically has a refractive index of n=1, which is significantly different from the refractive index of the bottom part of about n=3.

In summary, the light beam 10 is diffracted at the interface between the top part 10 and the liquid crystal material and a second time when the light beam 10 leaves the bottom part 16. In other words, the optical effect of the optical element 8 and the solid immersion lens 6 plus the bottom part 16 is essentially identical to the optical effect of a cuboid. Consequently, the optical properties of the objective lens 2 in the far-field mode shown in FIG. 1 are dominated by the lens 4. Due to this measure, a working distance 18 between a storage medium 20 and the objective lens 2 of about 200 μm is reached.

If the refractive index of the optical element 8, i.e. the refractive index of the liquid crystal material, is switched to a value of approximately n=1, the objective lens 2 is switched from the far-field mode shown in FIG. 1 to a near-field mode shown in FIG. 2. The optical effect of this change in the refractive index is that the solid immersion lens 6 becomes effective. The solid immersion lens provides a comparable effect as if it is used in air.

Since the working distance 18 is reduced to a value of about 20 to 50 nm, evanescent waves from the storage material 20 travel over the working distance 18 into the bottom part 16 and the solid immersion lens 6, respectively. The objective lens 2 shown in FIG. 2 is thus suitable for the optical near-field regime.

Figure 3:
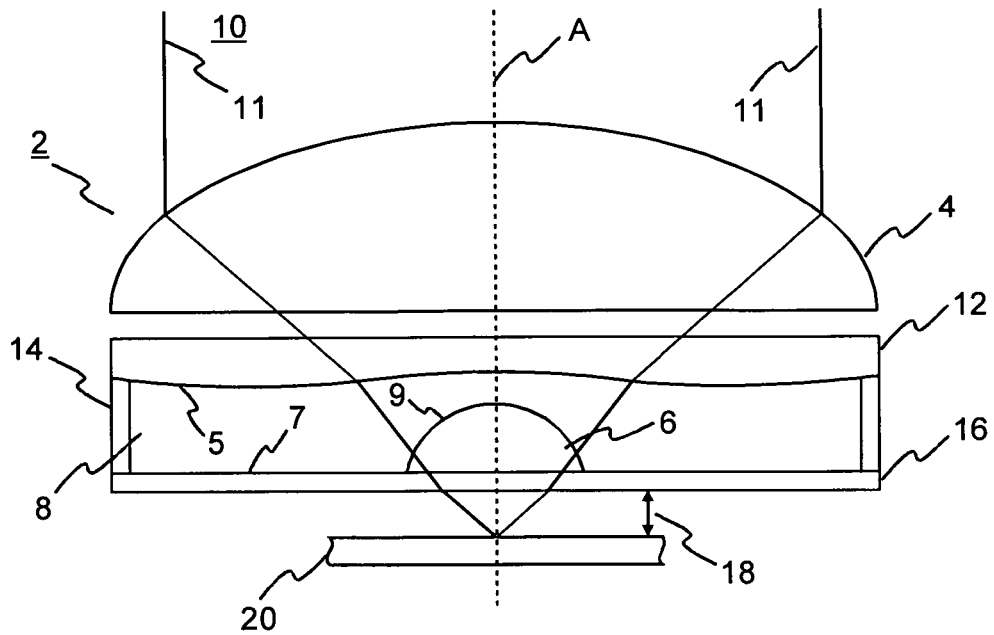
FIG. 3 shows an objective lens according to a further embodiment in a far-field mode, FIG. 4 show an objective lens according to a further embodiment in the near-field mode.

If the objective lens 2 is used in the far-field mode, as it is depicted in FIG. 1, the optical element 8 and the solid immersion lens 6 optically act as if they were a single monolithic block. However, the more or less cuboid shape of the optical element 8 plus the solid immersion lens 6 causes spherical aberration effects to the light beam 10. According to a further embodiment, which is illustrated in FIG. 3, the top part 12 of the optical element 8 has the shape of a spherical aberration correction lens. By way of example only, this spherical aberration correction lens has the shape of a Schmidt-plate, which is known in principle from the so called Schmidt-telescope.

As it is known from the embodiment shown in FIGS. 1 and 2, the optical element 8 is a liquid crystal. For the sake of clarity, electrodes for applying an electric field to the liquid crystal material, for switching the refractive index of said liquid crystal, are omitted in FIG. 3.

In the far-field mode, the difference between the refractive indices of the top part 12 and the liquid crystal material is large. Preferably, the top part 12 has a refractive index close to n=1, whereas the liquid crystal material confined by the cavity, i.e. the optical element 8, has a refractive index in the range of n=3. In contrast, the difference between the refractive indices of the optical element 8 and the solid immersion lens 6 and the bottom part 16 is low, since the latter elements are preferably made from a material having a refractive index of about n=3.

Consequently, the interface between the top part 12 and the optical element 8, i.e. the top surface 5 of the optical element 8, is the only interface causing refraction.

Figure 4:
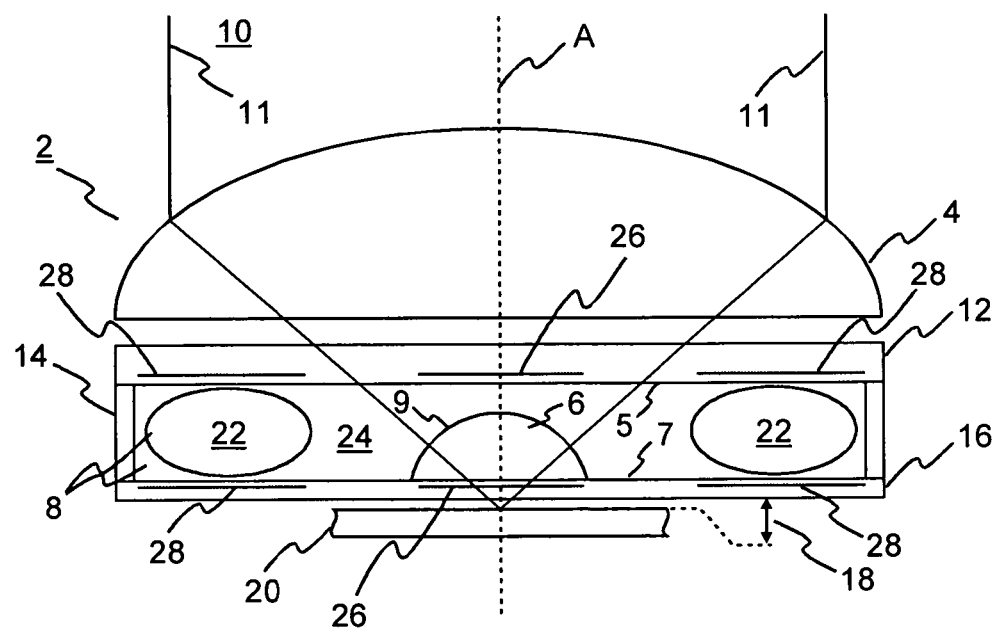
Figure 5:
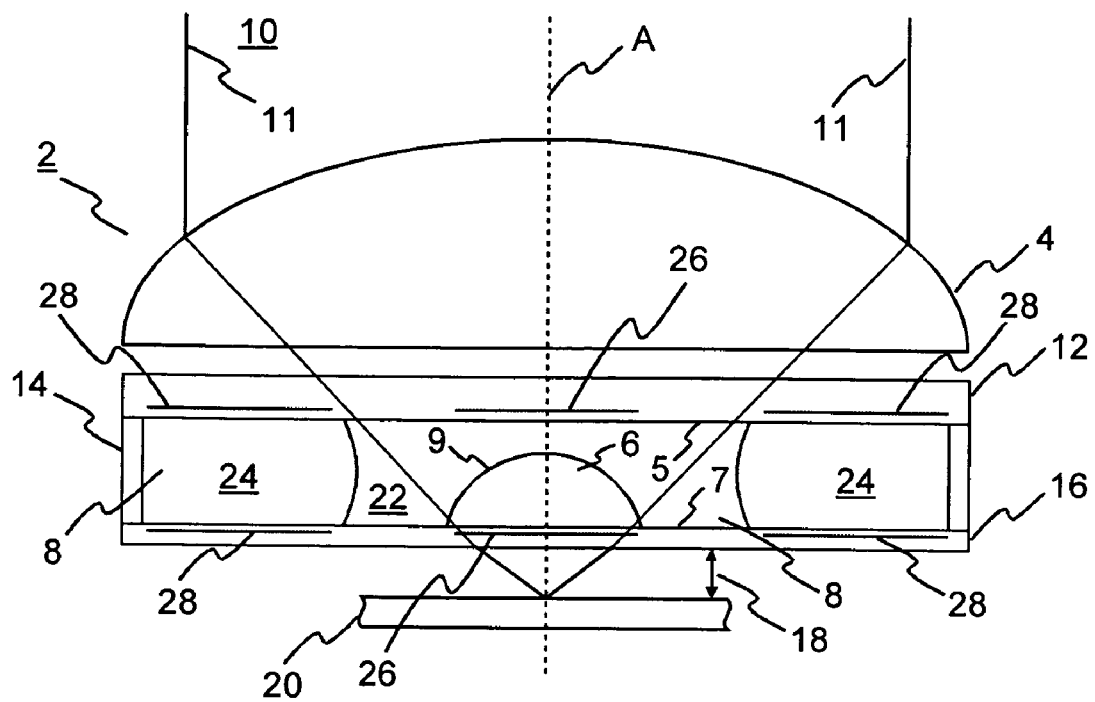
FIG. 5 depicts the objective lens of FIG. 4 in the far-field mode.

According to a further embodiment of the invention, which is shown in FIGS. 4 and 5, the optical element 8 is constituted by a liquid having two immiscible phases with different refractive indices. FIG. 4 illustrates the case of the objective lens 2 working in the far-field mode, whereas FIG. 5 depicts the near-field mode. The refractive index of the optical element 8 is switched by moving one phase of a two-phased liquid confined by the cavity into a central region or into a peripheral region of said cavity.

The first phase of said liquid is a dielectric fluid 22, e.g. salted water, while the second phase, which is immiscible with the first phase, is e.g. silicone oil 24. A pair of first electrode segments 26 is located in a central part of the optical element 8, while a pair of second electrode segments 28 is located on the peripheral region of the optical element 8. By way of example, the second electrodes 28 have the shape of an annular ring disposed around the first electrode segments 26 and further having the optical axis A as a central axis. By applying an electrical field to the second electrodes 28, the dielectric fluid 22 is pulled into the peripheral part of the optical element 8 as it is shown in FIG. 4. Consequently, the refractive index of the optical element 8 is dominated by the silicon oil 24, since the peripheral part of the optical element 8 is located outside the optical path of the objective lens 2. In contrast, by applying an electric field to the first electrode segments 26, the dielectric fluid 22 is pulled into the central part of the optical element 8. Consequently, the refractive index of the optical element 8 is dominated by the refractive index of the dielectric fluid 22, as it is shown in FIG. 5. By moving the dielectric fluid 22 into and out of the central part of the cavity, the refractive index of the optical element 8 may be switched.

In summary an objective lens 2 is provided, which is preferably included in an optical pickup head of an optical data storage apparatus. Working distances 18 between several nanometers in the near-field mode and several hundred micrometers in the far-field mode are achieved.

REFERENCE SIGNS 2 objective lens
4 lens
5 top surface
6 solid immersion lens
7 bottom surface
8 optical element
9 convex side
10 light beam
11 rays
12 top part
14 annular ring
16 bottom part
17 electrodes
18 working distance
20 storage medium
22 dielectric fluid
24 silicone oil
26 first electrode segments
28 second electrode segments
A optical axis

What is claimed, is:

1. An objective lens, which is switchable between a far-field mode and a near-field mode, comprising:
a lens, an optical element having a variable refractive index and a solid immersion lens, which are disposed on a common optical axis, wherein the optical element is arranged at a convex side of the solid immersion lens and has a top and a bottom surface arranged adjacent to each other in a direction of the optical axis, the top surface having a curvature that is lower than a curvature of the convex side of the solid immersion lens, wherein the bottom surface of the optical element has a concave shape that is adapted to the shape of the convex side of the solid immersion lens, and wherein a difference between a refractive index of said optical element and the solid immersion lens is small in the far-field mode so that the solid immersion lens and the optical element act substantially as a single optical element in the far-field mode, whereas said difference is large in the near-field mode so that the optical effect of the solid immersion lens is significant in the near-field mode.

2. The objective lens according to claim 1, wherein in the far-field mode the refractive index of the optical element and the refractive index of the solid immersion lens are essentially identical.

3. The objective lens according to claim 1, wherein the optical element is a liquid having a variable refractive index being confined in a cavity limited by a top and bottom part in the direction of the optical axis, wherein the top and the bottom surfaces of the optical element are formed by a surface of the top and bottom part facing said cavity, respectively.

4. The objective lens according to claim 3, wherein the top and bottom part each comprise an electrode, said electrodes being designed for generating an electric field inside the cavity for switching the refractive index of said liquid.

5. The objective lens according to claim 3, wherein the liquid is a liquid crystal.

6. The objective lens according to claim 3, wherein the liquid consists of two immiscible phases having different refraction indices, one of the phases being a dielectric fluid, and wherein the top and bottom parts comprise segmented electrodes, a pair of first electrode segments being located in a central part and a pair of second electrode segments being located in a peripheral part of the optical element.

7. The objective lens according to claim 3, wherein the electrodes extend in a plane perpendicular to the optical axis.

8. The objective lens according to claim 3, wherein the electrodes are made from a light-transmissive material.

9. The objective lens according to claim 3, wherein a curvature of the top surface is at least approximately zero such that the top part has the form of a parallel plate, which extends in a plane perpendicular to the optical axis.

10. The objective lens according to claim 3, wherein the top part has a shape of a spherical aberration correction lens, and wherein the difference of the refractive indices between the top part and the liquid is higher in the far-field mode than in the near-field mode.

11. The objective lens according to claim 10, wherein the spherical aberration correction lens has a plane surface and a curved surface, wherein the curved surface of said correction lens faces the cavity.

12. The objective lens according to claim 11, wherein the spherical aberration correction lens is a Schmidt-plate.

13. The objective lens according to claim 1, wherein in the far-field mode the refractive index of the optical element as well as the refractive index of the solid immersion lens is in the range of n=3.

14. The objective lens according to claim 1, wherein in the near-field mode the refractive index of the optical element is approximately n=1.

15. An apparatus for reading from and/or writing to optical recording media, with an optical head for operation in a near-field mode and in a far-field mode, wherein said optical head comprises an objective lens according to claim 1.

* * * * *